April 21, 1964    M. HAMERMESH ETAL    3,130,315
METHOD AND APPARATUS FOR PRODUCING AND
ANALYZING POLARIZED GAMMA RADIATION
Filed Jan. 13, 1961
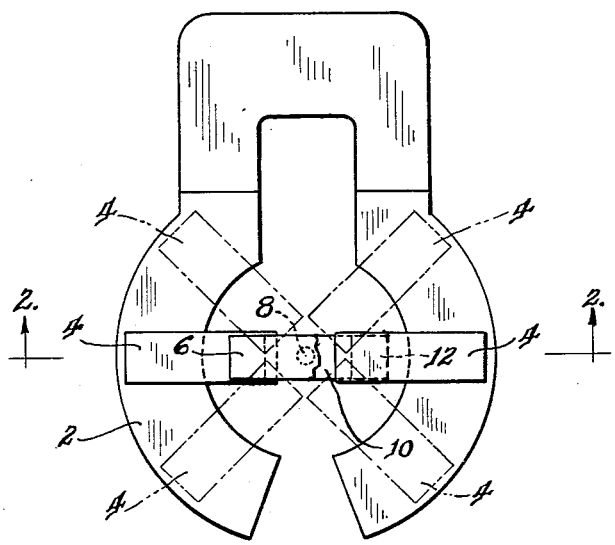
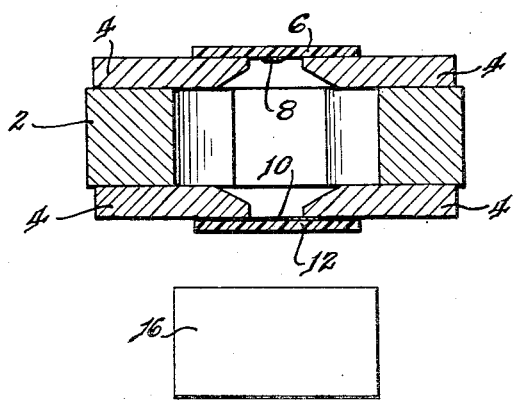
INVENTORS
*Morton Hamermesh*
*Stanley S. Hanna*
*Gilbert J. Perlow*
By
*Roland A. Anderson*
      *Attorney*

United States Patent Office 3,130,315
Patented Apr. 21, 1964

3,130,315
METHOD AND APPARATUS FOR PRODUCING AND ANALYZING POLARIZED GAMMA RADIATION
Morton Hamermesh, Villa Park, Stanley S. Hanna, Western Springs, and Gilbert J. Perlow, Downers Grove, Ill., assignors to the United States of America as represented by the United States Atomic Energy Commission
Filed Jan. 13, 1961, Ser. No. 82,662
8 Claims. (Cl. 250—106)

The present invention relates to a method and apparatus for obtaining and detecting plane-polarized light in the hard X-ray or γ-ray frequency band, a band of much shorter wave length than ordinary light. In particular, the invention relates to producing and detecting plane-polarized electromagnetic radiation of approximately 14 kev.

It is an object of this invention to provide a method and apparatus to determine the magnetic properties of ferromagnetic material in thin foils. Conventional methods are inconvenient for measuring these properties in thin foils. In particular, permeability and saturation effects are conveniently measured by the method and apparatus of this invention.

It is a further object of this invention to provide a means to investigate the nuclear Zeeman effect in the energy states of $Fe^{57}$.

Visual light can be plane-polarized by a Nichol prism or tourmaline. These substances are not useful for the higher energy radiation band.

This invention is based on the Mössbauer effect. In the emission of radiation from a free nucleus of mass M, the nucleus recoils with an energy $E^2/2Mc^2$, where E is the energy of the nuclear transition and $c$ is the velocity of light. Hence the energy of the emitted quantum is $E-E^2/2Mc^2$. Similarly, for absorption the quantum must have an energy $E+E^2/2Mc^2$. Therefore in the resonant emission and re-absorption process involving the same nuclear species, there is a line shift of magnitude $E^2/Mc^2$. Since the shift is usually greater than the nuclear line width the resonant absorption is greatly diminished.

Mössbauer demonstrated that under certain circumstances, a nucleus embedded in a solid will not recoil on emission or absorption of radiation. A highly important result of this process is the fact that in this process the emission and absorption lines are not broadened by thermal Doppler motion and one observes the natural energy spread of the radiation. This was published by Mössbauer in Zeitschrift für Physik, 151, 124 (1958); Naturwissenschaften 45, 538 (1958); and Zeitschrift für Naturforschung 14a, 211 (1959).

As has been observed with X-rays, the fraction of nuclei in a solid which emit or absorb without recoil is given by the Debye-Waller factor $f=E^{-2W}$ where $$W = 3\frac{R}{k\theta}\left[\frac{1}{4} + F\left(\frac{T}{\theta}\right)\right]$$

R is the recoil energy, $\theta$ the Debye temperature and F a function of $T/\theta$ which has been tabulated in references on X-rays.

It can be seen from the Debye-Waller factor that a large resonant absorption can be obtained if the recoil energy is small compared to the Debye energy $k\theta$. Furthermore the function $F(T/\theta)$ decreases with decreasing temperature so that absorption can be large if the temperature is low compared to the Debye temperature.

The finding that $Fe^{57}$ showed the Mössbauer effect brought with it certain advantages. Because of the low energy of its radiation and fairly high Debye temperature, resonant absorption is very large at room temperature. The resonant level is very narrow. Furthermore, iron as well as many of its compounds and alloys are ferromagnetic.

The discovery involved in the present invention is that the magnetizing of an iron source containing excited atoms of $Fe^{57}$ causes a plane polarization of the emitted 14 kev. photons.

$Fe^{57}$ is a radioactive disintegration product of $Co^{57}$, which is produced by the deuteron bombardment of iron. It can be separated from some of the inactive iron by the well known ether extraction of $FeCl_3$. It is then converted to sulfate with the remaining iron in the ferrous state. The metals are co-plated from a weak sulfuric acid solution. $Co^{57}$ decays to $Fe^{57}$ in an excited state. The excited state emits the 14 kev. photon of interest in passing to the ground state. There is a high energy photon from a higher energy state of $Fe^{57}$ but this is not of interest, and does not interfere with the process of polarizing the 14 kev. photon.

$Fe^{57}$ absorbers are made by rolling very thin foils of ordinary iron, by virtue of its $Fe^{57}$ content as found in nature (2.20%). It is preferable to use iron enriched in the $Fe^{57}$ isotope, normally by mass spectograph separation. Some of the foils used contained 76% $Fe^{57}$. The thinnest rolled foil used was approximately 60 microinches thick. Thinner absorbers were obtained by plating $Fe^{57}$ upon copper foils.

Attention is now directed to FIGURES 1 and 2, which are plan and sectional views respectively of the preferred embodiment of the apparatus of the invention.

Referring to both of these figures, 2 is a high strength nickel-aluminum-iron alloy magnet commonly referred to as an alnico magnet, in modified horseshoe form. The outer diameter of the "yoke" is 4½", the inner diameter 2¼", thickness 1¼".

Carriers 4 are iron pieces, conveniently ⅜" thick, approximately 1¾" long, 9/16" wide, tapered at one end to about half thickness. There are two pairs of carriers 4, one pair on each of two opposite sides of magnet 2, with the taper facing inward and to the center of the yoke of magnet 2. In each pair, the carriers 4 are aligned and separated by a gap of about ¾". The carriers 4 are attached to magnet 2, for example, by screws.

A plastic strip 6 is attached to one pair of carriers 4, for example, by screws and is about as wide as the carriers. At the center of strip 6 between these carriers 4, a source 8 is cemented, which is formed of an alloy of active $Co^{57}$ and $Fe^{56}$ (99.91%) electroplated on a strip of iron of naturally occurring isotopic content, ½ mil thick, ⅛" wide, and ¼" long. There is a total amount of approximately 5 microcuries of $Co^{57}$ plated on the iron strip.

Absorber foil 10 is a piece of 0.1 mil thick foil of rolled $Fe^{57}$ (76%), cemented to a plastic supporting strip 12, which is attached to the other pair of carriers 4, for example, by screws. Absorber foil 10 is about as wide as the carriers 4 and somewhat longer than the gap between them so as to bridge the gap. The strip 12 is at least as wide as the absorber foil 10. A conventional detecting system 16 is positioned behind the absorber foil 10 so as to count the photons coming from the source 8 and passing through the absorber 10. This system 16 might advantageously consist of a photomultiplier and conventional counter in conjunction with a thin NaI crystal acting as a scintillator.

Polarization of the resonance radiation was demonstrated by measuring the transmission through foil 10 as a function of the relative orientation of the fields in the source and absorber. The counts per minute observed varied from a maximum of 5000 to a minimum of 3000. The difference in angle between the positions at which maxima and minima were observed was 90°. The readings in between these angles followed the expected sine curve. This was an effective demonstration of polarization.

Relative rotation between the source 8 and absorber foil 10 is obtained by repeated detachment of the subassembly comprising foil 10, strip 12, and the two associated carriers 4, angular adjustment of the subassembly about the axis of the magnet 2, and reattachment of the subassembly. The said subassembly is angularly adjusted through 90° between the extreme positions shown in dash-dot lines in FIGURE 1.

Curiously the maxima and minima did not occur when the fields of absorber 10 and source 8 were at an angle of 90° and parallel to each other. This is probably explained by a small amount of magnetism in the absorber 10.

It is not essential that this embodiment be retained for all uses. For example, the magnet may become two magnets, placed parallel and coaxial to each other. The magnets may be electromagnets rather than permanent magnets. Electromagnets would in fact be highly desirable in measuring magnetic properties of foils or magnetization and direction of magnetization of such foils. There is sufficient $Fe^{57}$ in natural iron or preponderantly iron alloys to serve as an absorber. By varying the current to the electromagnet for the absorber, saturation of magnetization could be observed when the difference in count reaches a maximum at positions 90° apart.

The method of using the present invention for the investigation of the nuclear Zeeman effect can be found in a paper by the present applicants Hanna and Perlow and others, all of Argonne National Laboratory, in Physical Review Letters, volume 4, Number 4, page 177, dated February 15, 1960.

It will be understood that this invention is not to be limited to the details given herein, but that it may be modified within the scope of the appended claims. In particular it is not to be limited to the apparatus described in detail, since the teachings illustrate a general method for producing plane-polarized electromagnetic radiation in the kev. range. It is further not to be limited to radiation from $Fe^{57}$, since it is adaptable to any other radioactive substance showing the Mössbauer effect that is itself ferromagnetic, or can be alloyed or combined with a ferromagnetic substance, or form with another substance a ferromagnetic alloy or compound.

What is claimed is:

1. A method of detecting polarization and the angle thereof for radiation in the kev. energy range, comprising interposing in the path of said radiation an absorber containing unexcited source atoms embedded in ferromagnetic material and positioned in a magnetic field, and rotating said absorber in a plane perpendicular to the path of the radiation.

2. The method of claim 1 in which the radiation is obtained from $Fe^{57}$ originating in the decay of $Co^{57}$, the ferromagnetic material is iron, and the absorber contains $Fe^{57}$.

3. An apparatus for polarizing electromagnetic radiation in the kev. range comprising a pair of opposed magnet poles, with a gap therebetween, and a material capable of emitting electromagnetic radiation in said kev. range, said material being combined with ferromagnetic material positioned in the magnetic field between said poles.

4. The apparatus of claim 3 in which the source of electromagnetic radiation is $Fe^{57}$ originating in the decay of $Co^{57}$, and the ferromagnetic material is iron.

5. An apparatus for polarizing and resolving the angle of polarization of electromagnetic radiation in the kev. range, comprising a magnet, a source containing material emanating said electromagnetic radiation combined with ferromagnetic material positioned in the magnetic field of said magnet, an absorber comprising the inert form of the source material combined with ferromagnetic material positioned in the magnetic field of the magnet, means for rotating said absorber in a plane perpendicular to said radiation, and means for detecting the radiation absorbed by said absorber.

6. The apparatus of claim 5 in which the source is $Fe^{57}$ originating in the decay of $Co^{57}$ combined with iron and the absorber is a thin foil of ordinary iron.

7. The apparatus of claim 6 in which the $Fe^{57}$ originating in the decay of $Co^{57}$ is combined with $Fe^{56}$ and the absorber is a thin foil of iron enriched in $Fe^{57}$.

8. The apparatus of claim 7 in which the absorber is a foil of iron enriched in $Fe^{57}$ sufficiently thin to allow passage of a substantial portion of the electromagnetic radiation.

References Cited in the file of this patent

UNITED STATES PATENTS

| 2,847,581 | Clark | Aug. 12, 1958 |
| 2,890,345 | Muffy | June 9, 1959 |
| 2,929,922 | Schawlow et al. | Mar. 22, 1960 |
| 2,952,503 | Becker | Sept. 13, 1960 |
| 3,024,364 | Wanetick | Mar. 6, 1962 |

OTHER REFERENCES

Roberts, "Rotational Spectrum of $OC^{14}S$ and the Nuclear Spin of $C^{14}$," Physical Review, June 1, 1948, p. 1405.

Pound et al., "Resonant Absorption of the 14.4 Kev. Gamma Ray . . . ," Physical Review, Dec. 15, 1959, pp. 554–556.

Schiffer et al., "Recoilless Resonance Absorption Gamma Rays in $Fe^{57}$," Physical Review, Dec. 15, 1959, p. 556.

Pound et al., "Apparent Weight of Photons," Physical Review, Apr. 1, 1960, pp. 337–341.

Hughes et al., "Upper Limit for the Anisotropy of Inertial Mass From Nuclear Resonance Experiments," Physical Review Letters, Apr. 1, 1960, p. 342.